(12) United States Patent
Greer

(10) Patent No.: US 10,636,036 B1
(45) Date of Patent: Apr. 28, 2020

(54) COPYRIGHT CLEARINGHOUSE SYSTEM AND METHOD

(71) Applicant: Lee Anthony Greer, Nashville, TN (US)

(72) Inventor: Lee Anthony Greer, Nashville, TN (US)

( * ) Notice: Subject to any disclaimer, the term of this patent is extended or adjusted under 35 U.S.C. 154(b) by 440 days.

(21) Appl. No.: 14/619,950

(22) Filed: Feb. 11, 2015

Related U.S. Application Data

(60) Provisional application No. 61/938,210, filed on Feb. 11, 2014.

(51) Int. Cl.
*G06Q 40/00* (2012.01)
*G06Q 30/00* (2012.01)
*G06Q 50/18* (2012.01)

(52) U.S. Cl.
CPC .......... *G06Q 30/00* (2013.01); *G06Q 50/184* (2013.01)

(58) Field of Classification Search
USPC ................ 705/37, 4, 39, 38, 40, 59; 726/28; 84/470 R; 707/916, 781; 380/285; 235/375
See application file for complete search history.

(56) References Cited

U.S. PATENT DOCUMENTS

| | | | | |
|---|---|---|---|---|
| 5,758,068 A * | 5/1998 | Brandt | ................... | G06F 21/10 705/59 |
| 6,009,525 A * | 12/1999 | Horstmann | ............. | G06F 21/10 705/54 |
| 6,976,010 B2 * | 12/2005 | Banerjee | ............... | G06F 16/958 705/51 |
| 7,672,897 B2 * | 3/2010 | Chung | ................... | G06Q 30/08 705/35 |
| 8,219,555 B1 * | 7/2012 | Mianji | .................... | G06F 16/38 707/736 |
| 8,311,948 B1 * | 11/2012 | Lu | .......................... | G06Q 50/01 705/319 |
| 8,935,620 B1 * | 1/2015 | Cox | ....................... | G06F 3/0483 709/203 |
| 8,990,188 B2 * | 3/2015 | Yen | ...................... | G06Q 50/184 707/717 |
| 2001/0049648 A1 * | 12/2001 | Naylor | ................... | G06Q 30/08 705/37 |
| 2002/0002523 A1 * | 1/2002 | Kossovsky | ............ | G06Q 10/10 705/36 R |
| 2002/0091848 A1 * | 7/2002 | Agresta | .............. | H04N 7/17318 709/231 |
| 2003/0131252 A1 * | 7/2003 | Barton | ................ | G06F 11/1417 713/193 |
| 2003/0177074 A1 * | 9/2003 | Ramanathan | ........... | G06F 21/10 705/59 |

(Continued)

*Primary Examiner* — Tien C Nguyen
(74) *Attorney, Agent, or Firm* — Wayne Edward Ramage; Baker Donelson

(57) ABSTRACT

A system and method for users of copyrighted works to acquire after-the-fact clearances or rights from owners of protected works. Protected works include copyrighted works, such as musical works, literary works, movies, and the like. A computer-based electronic exchange collects and contains data on sellers and buyers of protected works, as well as historical usage data by buyers and users of a particular protected work. The system determines recommended bid and ask prices for the parties based on analysis of historical usage of various combinations of buyers and sellers for various protected works.

10 Claims, 12 Drawing Sheets

(56) References Cited

U.S. PATENT DOCUMENTS

| | | | |
|---|---|---|---|
| 2006/0005256 A1* | 1/2006 | Cox | G06F 21/10 726/27 |
| 2006/0101269 A1* | 5/2006 | Moskowitz | G06F 21/10 713/176 |
| 2008/0301058 A1* | 12/2008 | Campbell | G06Q 30/06 705/80 |
| 2009/0037315 A1* | 2/2009 | Chu | G06Q 10/00 705/37 |
| 2010/0175093 A1* | 7/2010 | Arnold | H04N 21/25866 725/74 |
| 2011/0135271 A1* | 6/2011 | Van Hoff | H04N 21/21 386/200 |
| 2012/0272336 A1* | 10/2012 | Cohen | G06F 21/10 726/28 |

* cited by examiner

COPYRIGHT CLEARINGHOUSE SYSTEM AND METHOD

COPYRIGHT CLEARINGHOUSE SYSTEM AND METHOD

This application claims benefit of and priority to U.S. Provisional Application No. 61/938,210, filed Feb. 11, 2014, by Lee Greer, and is entitled to that filing date for priority. The specification, figures and complete disclosure of U.S. Provisional Application No. 61/938,210 are incorporated herein by specific reference for all purposes.

FIELD OF INVENTION

This invention relates to a system and method for copyright owners to engage in negotiations for clearances of copyrighted works. More particularly, this invention relates to a system and method to assist music copyright owners with negotiations with users and potential users for clearances of copyrighted works.

SUMMARY OF INVENTION

In various embodiments, the present invention comprises a platform and system for copyright owners to engage users and potential users in negotiations to clear performances or rights to protected works. Protected works may include, but are not limited to, copyrighted works. Protected works include, but are not limited to, musical works, movies, audio-visual works, literary works, and the like. While the system is discussed herein in the context of music rights, it should be understand that it can be applied to other forms of protected/copyrighted works.

In one exemplary embodiment, the system comprises a computer-based electronic exchange. In various embodiments, the electronic exchange may be termed a National Performing Rights Exchange (NPREX) or a National Synchronization Rights Exchange (NSREX). The exchange may be in the form of a closed, secure website connected to an SQL or other database. The database contains data on music owners ("sellers"), music users ("buyers"), and usage by the music user (or all users) of a particular owner's music.

A person (which includes buyers and sellers) can access the exchange by directing a web browser or an application to the exchange opening page and login page. The person may login to an existing account, or may create an account according to the person type (e.g., buyer, seller). After an account is created, the person may directly log in. They are then directed to the appropriate type of interface page: buyers are directed to the buyer page, and sellers are directed to the seller usage page.

The buyer page comprises a detailed music usage record and summary that lists the total uses (performances) of particular works (here identified by seller and title). The usage summary provides a summary list by seller of title counts and total performance counts.

Similarly, the seller usage page provides a detailed music usage record and summary from the seller's (music owner's) perspective, identifying performance counts by buyer and title, and summarized total titles and performance counts for particular buyers.

Based upon the music usage record for both sellers and buyers, the system then matches music buyers with empowered music sellers so that the two parties may transact business. Empowered sellers are the owners of a title (or their representatives or agents) who retain the authority to license the title (e.g., song). In the system, the empowered seller can use the pricing algorithm (described below), post ask prices, and accept bid prices. In several embodiments, the system recognizes only one empowered seller account per title.

The negotiation process between buyer and seller is facilitated through the system by the "Bid-Ask Exchange" tables on the buyer's page and the seller's pricing page, which the seller may access by a link on the seller's usage page. Either buyer or seller may commence negotiations, which involve a process of resolving bid prices entered by the buyer and ask prices entered by the seller. Once negotiations begin, negotiations will continue until either a deal is reached, or one of the parties indicates to the system that it desires to cease negotiations.

The buyer enters bid prices through the buyer's "Bid-Ask Exchange" table. The buyer has complete discretion over the bid prices.

The seller enters ask prices through the seller's "Bid-Ask Exchange" table. The seller has complete discretion over the ask prices. In one embodiment, the seller may use a pricing algorithm to generate suggested ask prices, but the seller may or may not take the generated ask prices into consideration in setting the ask price.

The pricing algorithm may be implemented by the seller from the seller's pricing page. In one embodiment, the pricing algorithm generates a suggested ask price based on the music usage record for the title, and a "Pricing Parameter" that reflects the level of aggressiveness desired by the seller. In general, the lower the number for the Pricing Parameter, the more aggressively the seller desires to price. The seller generally has the discretion to determine how aggressively it desires to price. In the embodiment shown, the Pricing Parameter is a positive integer greater than or equal to "2". In this embodiment, "1" is equivalent to monopoly pricing, and is not permitted by the system. In several embodiments, the pricing algorithm is calibrated with the music buyer's (e.g., music broadcaster's) actual music usage data. It generates an optimized "nonlinear" price, or optimized blanket price, similar to the blanket license used in the music industry. The system can be used to negotiate a clearance in a variety of legal forms, including, but not limited to, licenses, covenants not-to-sue, and waivers. For example, the negotiation may be for an ex post clearance for previously unlicensed performances of the seller's copyrighted works, in which case the buyer is obtaining a promise (i.e., waiver, or covenant not-to-sue) from the seller not to sue the buyer for those previously unlicensed performances. In an alternative embodiment, the negotiation may be based, in whole or in part, on past performances that were licensed.

BRIEF DESCRIPTION OF THE DRAWINGS

FIG. 3 shows an example of a home page.

FIG. 4 shows an example of a page for creating a buyer account.

FIG. 5 shows an example of a page for creating a seller account.

FIG. 7 shows an example of a buyer's page.

Figure 8:
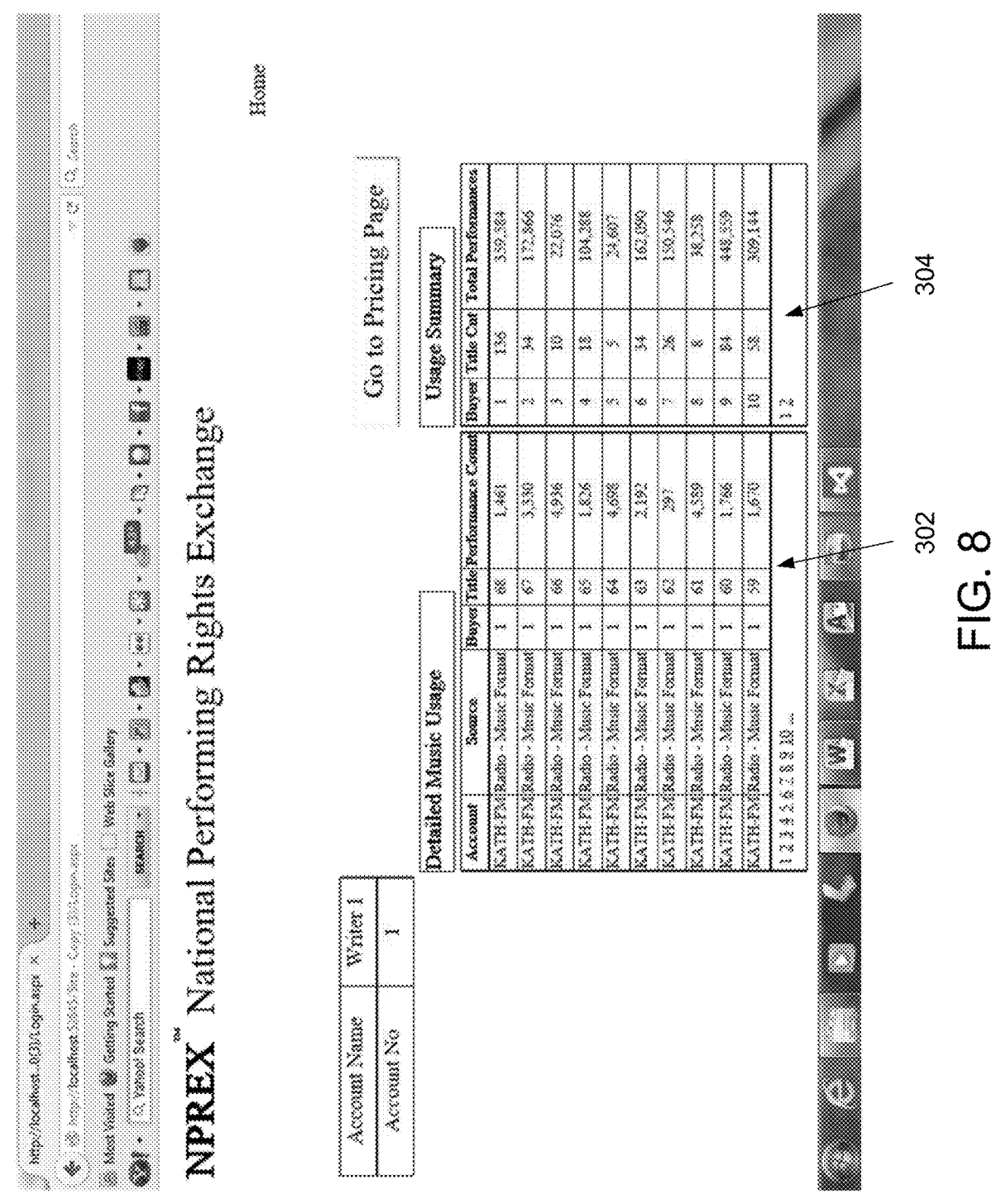

FIG. 8 shows an example of a seller's usage page.

FIG. 12 shows an example of a buyer's page for a synchronization rights system in accordance with another embodiment of the present invention.

DETAILED DESCRIPTION OF EXEMPLARY EMBODIMENTS

In several exemplary embodiments, the present system provides a platform and system for copyright owners to engage users and potential users in negotiations to clear performances or rights to protected works. Protected works may include, but are not limited to, copyrighted works. Protected works include, but are not limited to, musical works, movies, audio-visual works, literary works, and the like. While the system is discussed herein in the context of music rights, it should be understand that it can be applied to other forms of protected/copyrighted works.

In one exemplary embodiment, the system comprises a computer-based electronic exchange. In various embodiments, the electronic exchange may be termed a National Performing Rights Exchange (NPREX) or a National Synchronization Rights Exchange (NSREX). The exchange may be in the form of a closed, secure website connected to an SQL or other database. The database contains data on music owners ("sellers"), music users ("buyers"), and usage by the music user (or all users) of a particular owner's music.

Figure 1:
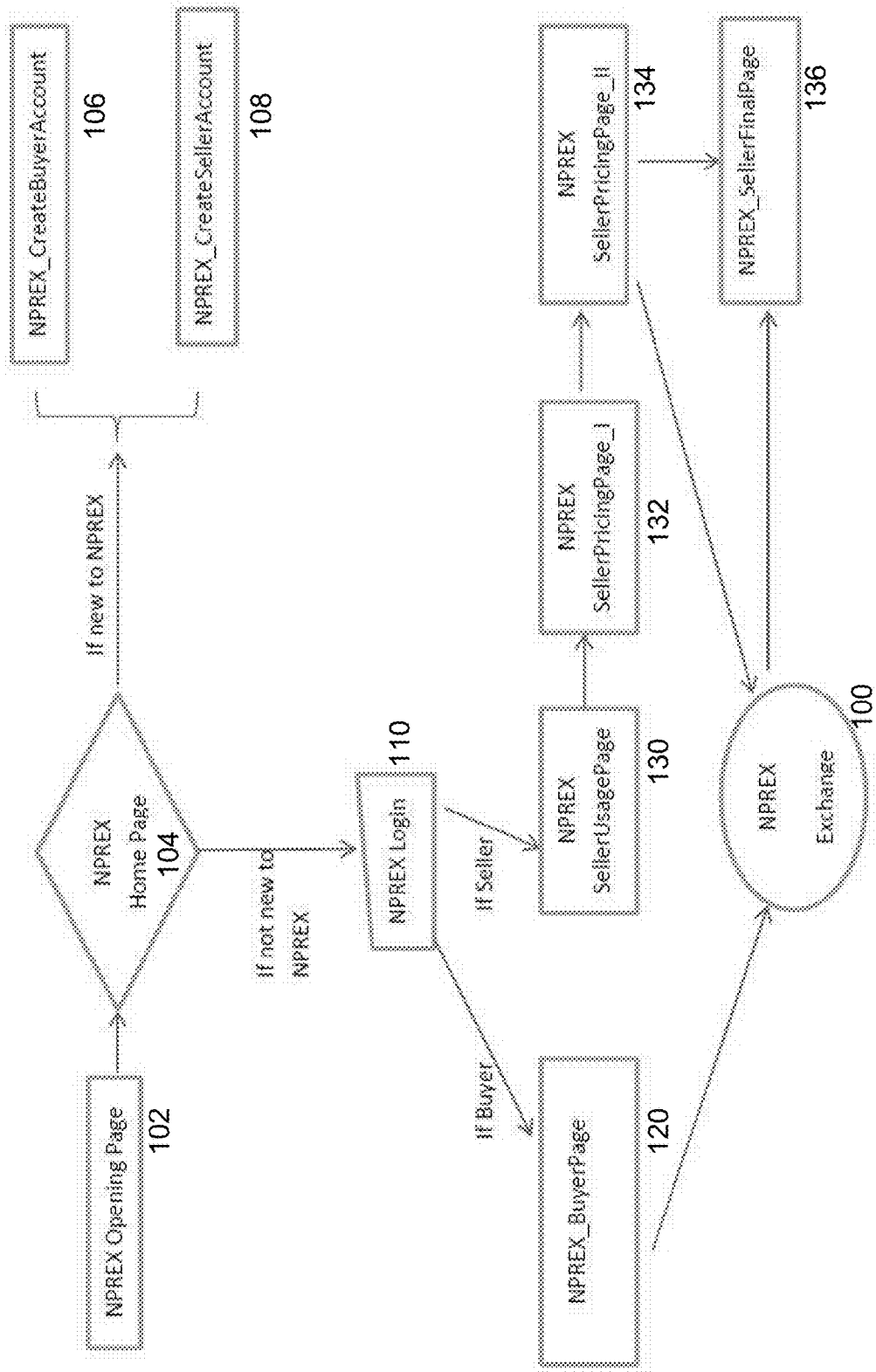
FIG. 1 shows a view of a system in accordance with an embodiment of the present invention.
Figure 2:
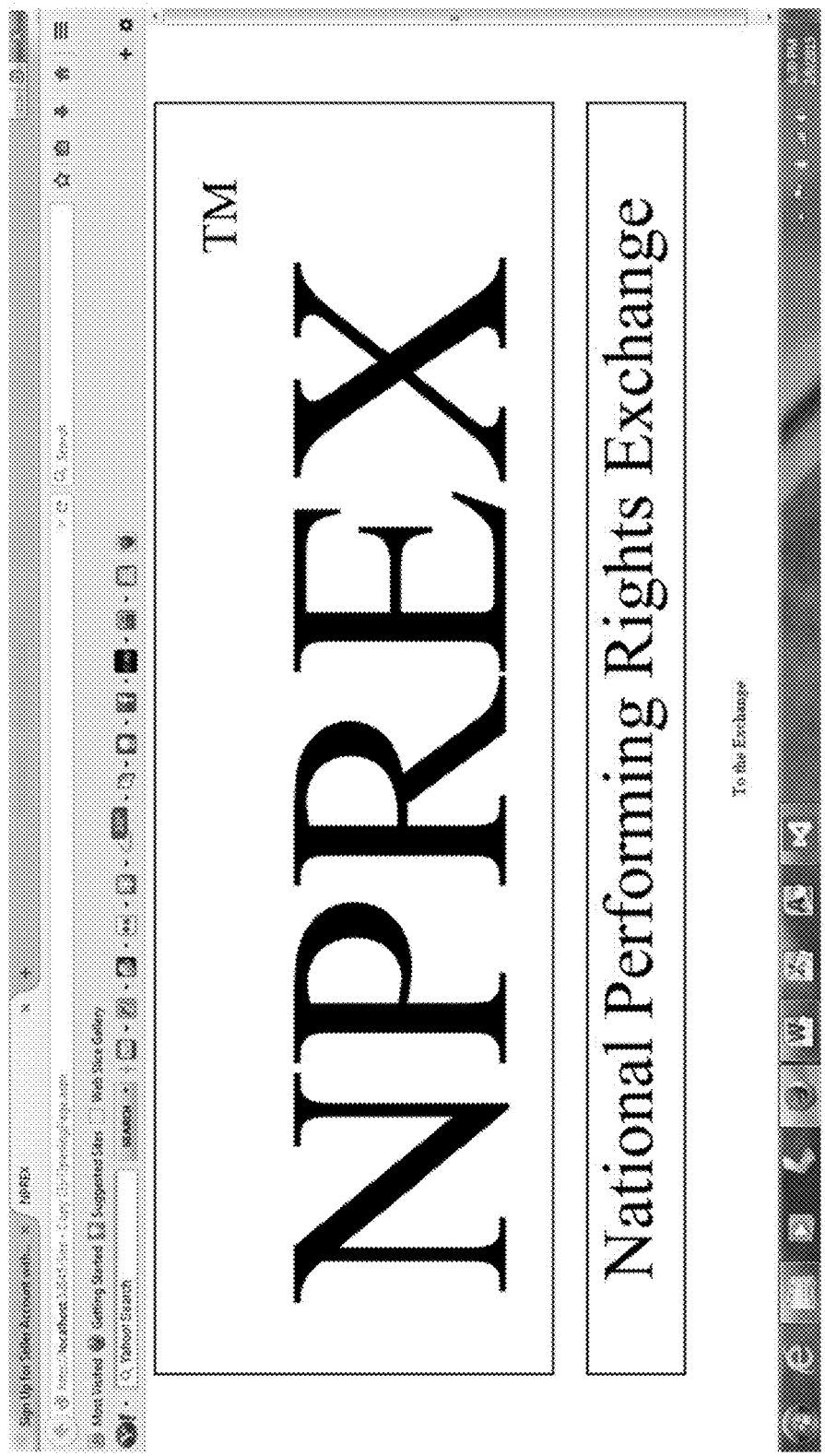
FIG. 2 shows an opening page of a performance rights system in accordance with an embodiment of the present invention.
Figure 3:
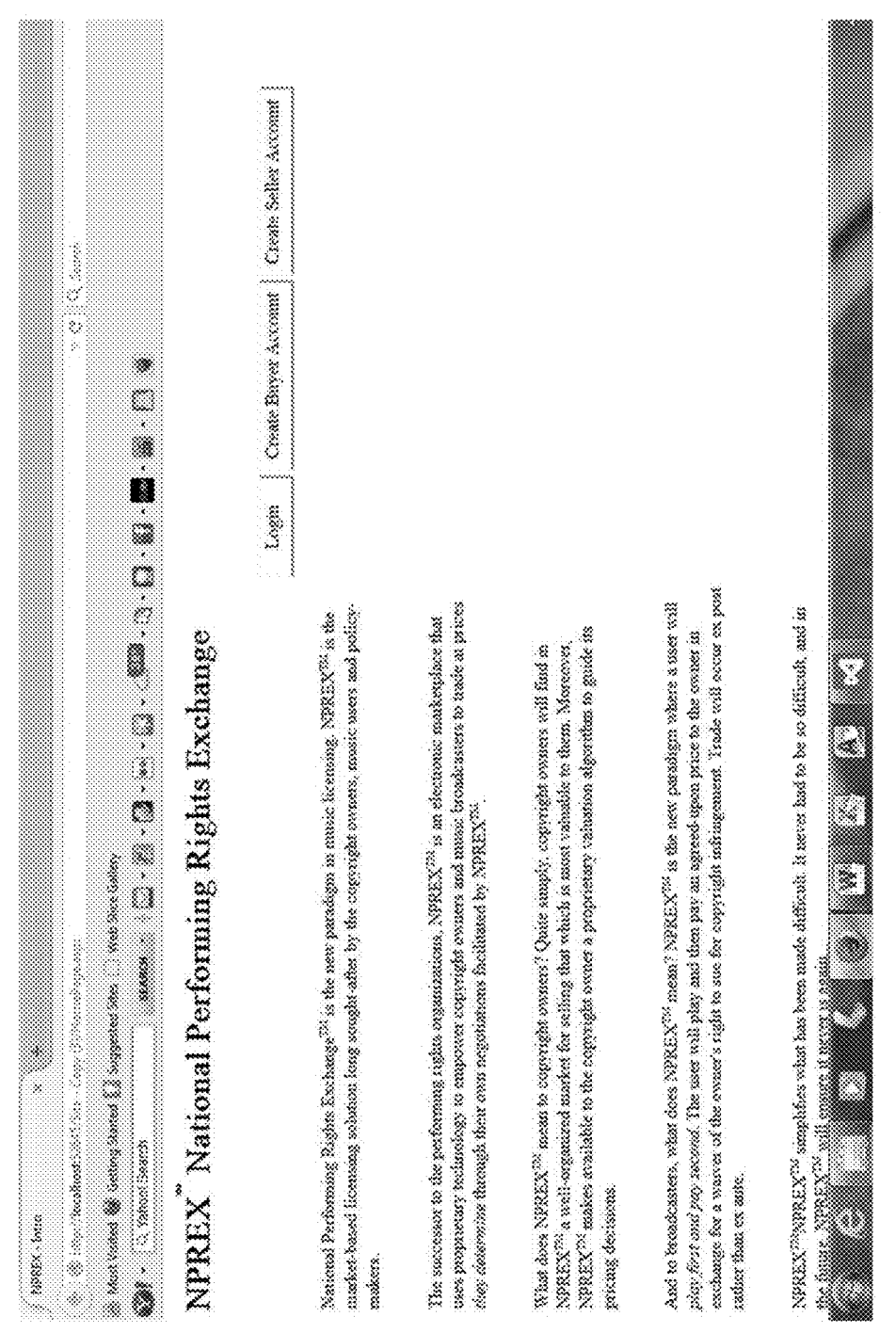
Figure 4:
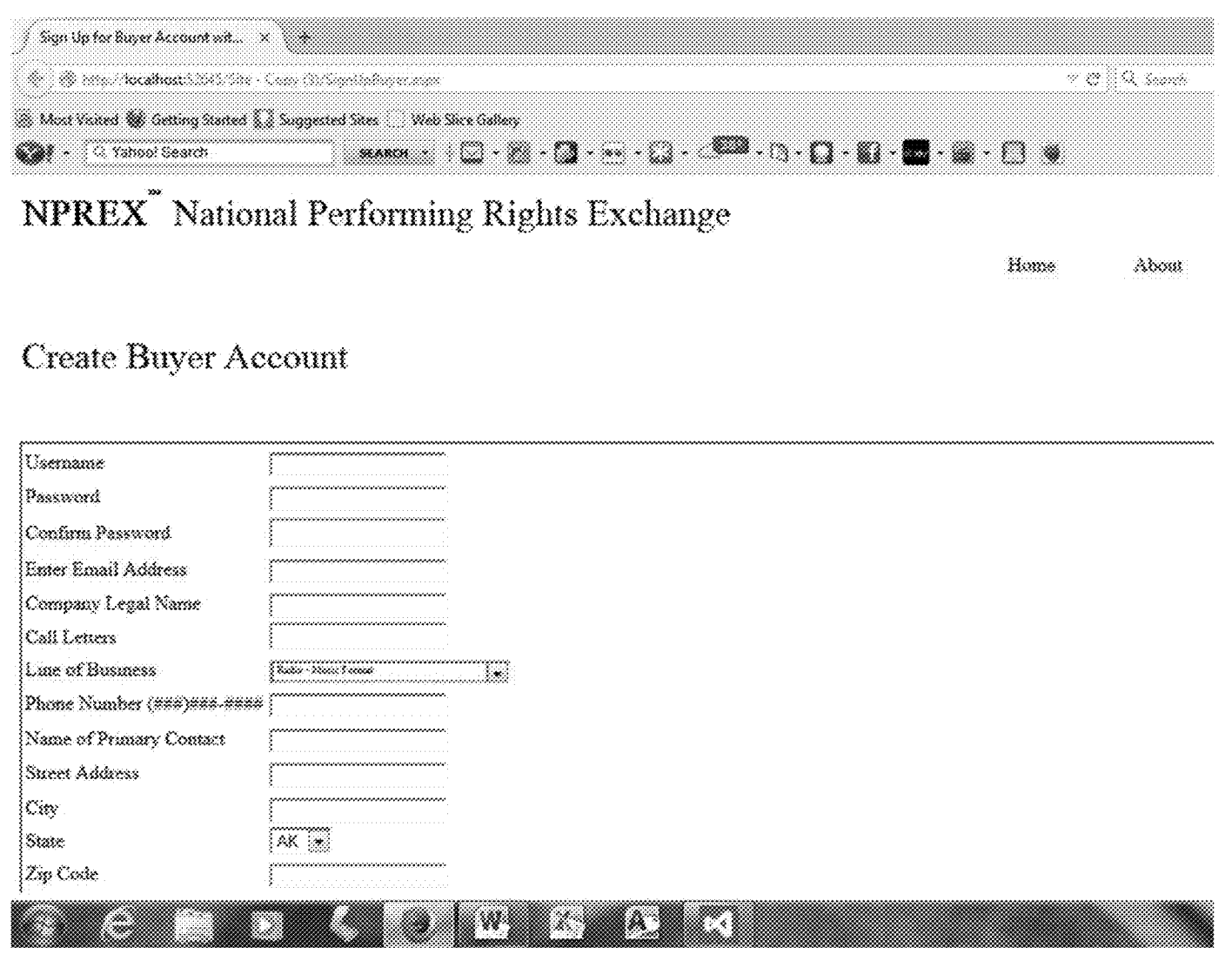
Figure 5:
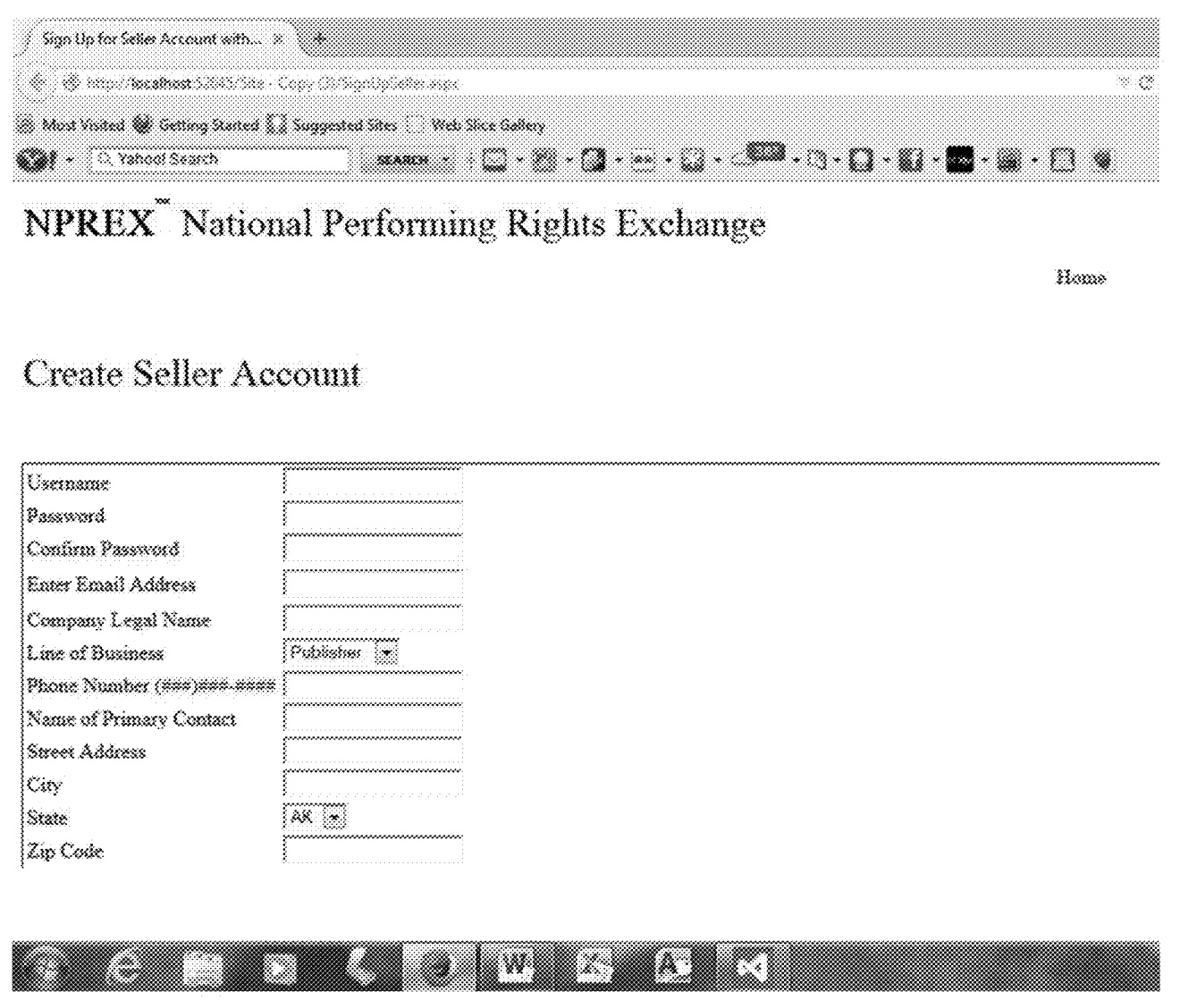
Figure 6:
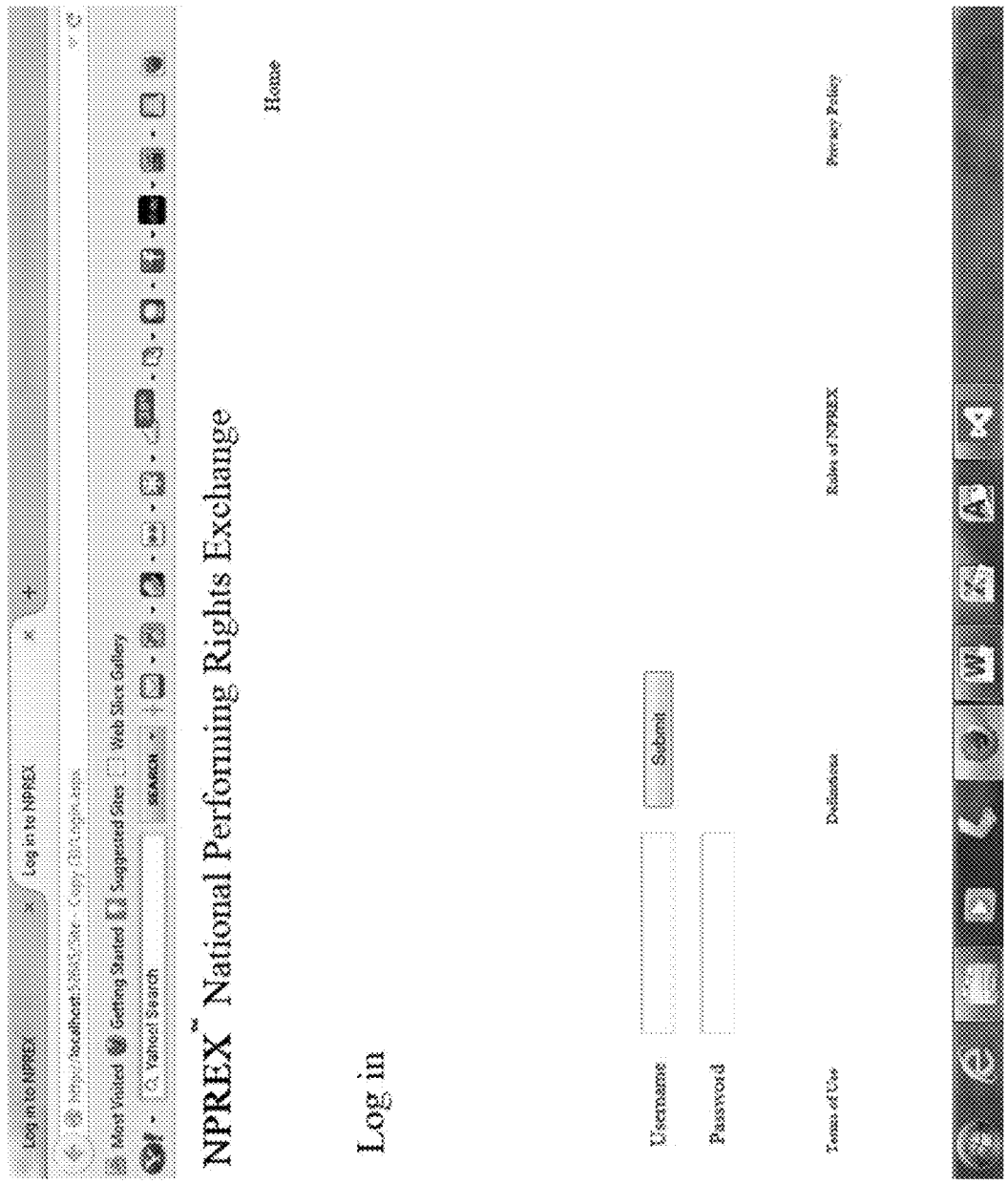
FIG. 6 shows an example of a login page.

As seen in FIG. 1, a person (which includes buyers and sellers) can access the exchange 100 by directing a web browser or an application to the exchange opening page 102 and home page 104 (examples are seen in FIGS. 2 and 3). The person may login 110 to an existing account, or if new to the system, may create an account according to the person type (e.g., buyer 106, seller 108), as seen in FIGS. 4 and 5. After an account is created, the person may directly log in 110, as seen in FIG. 6. They are then directed to the appropriate type of interface page: buyers are directed to the buyer page 120, as seen in FIG. 7, and sellers are directed to the seller usage page 130, as seen in FIG. 8.

The buyer page (FIG. 7) comprises a detailed music usage record 202 and summary 204. The detailed music usage record 202 shows a list or table of total performances (uses or plays) of particular works by the buyer during a period of time, where the works are identified by seller name or number and title name or number.

Abbreviations or names for the seller and title can be used in place of numbers. The detailed usage summary 204 provides a summary list or table by seller (which can identified by number, as shown, or by name or abbreviation) for the total number of titles owned or controlled by the seller that have been used by the buyer, and the total number of performances (uses or plays) of all such titles in the aggregate. For both lists or tables, there can be several pages of information, which the user can review by selecting page numbers along the bottom of each table. The performance information can be for a pre-established or set period, or a period separately determined by the buyer, the exchange, or other entity.

Figure 7:
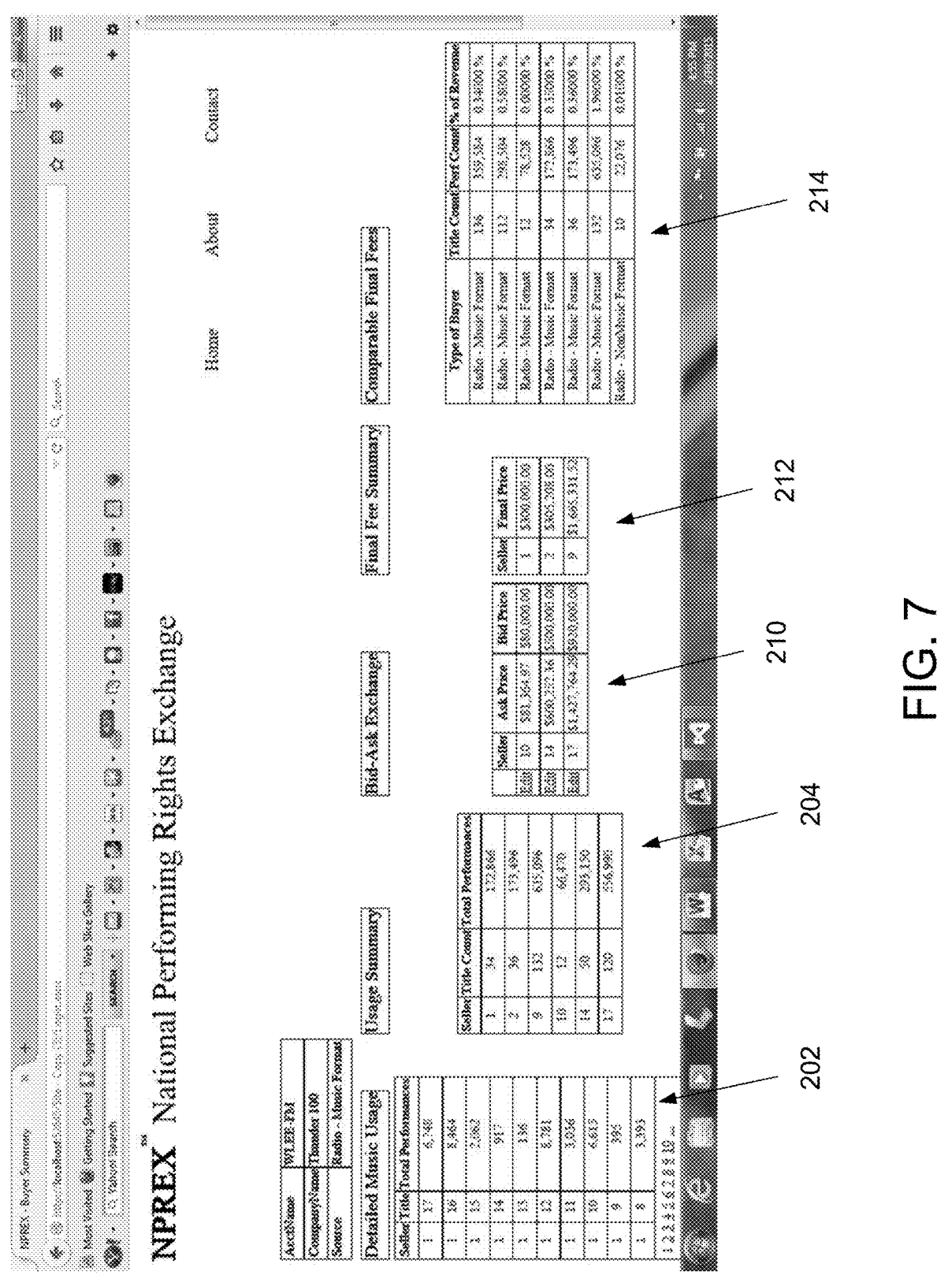

As seen in FIG. 7, the buyer page also can display a final fee summary 212 for completed transactions, and a comparable final fee summary 214 showing types of buyers, title counts, performance counts, and percentage of the buyer's revenue for each set of figures.

A user who is a seller sees a similar seller usage page (FIG. 8) that provides a detailed music usage record 302 and summary 304 from the seller's (music owner's) perspective. The detailed music usage record 302 shows the total performance count for the period (as described above) for a particular work identified by title number (or by name or abbreviation) for a particular buyer. The table also shows the account name and source type (e.g., radio-music format; radio-non music format; and so on) associated therewith. The usage summary 302 provides a summary list or table by buyer (identified by number, name or abbreviation) for the total number of titles owned or controlled by the seller that have been used by the buyer during the period, and the total number of performances (uses or plays) of all such titles in the aggregate. For both lists or tables, there can be several pages of information, which the user can review by selecting page numbers along the bottom of each table.

Based upon the music usage records for both sellers and buyers, the system matches music buyers with empowered music sellers so that the two parties may transact business, either to obtain waivers or rights for past performances, or rights for future performances. Empowered sellers are the owners of a title (or their representatives or agents) who retain the authority to license the title (e.g., song). In the system, the empowered seller can use the pricing algorithm (described below), post ask prices, and accept bid prices. In several embodiments, the system recognizes only one empowered seller account per title.

The negotiation process between buyer and seller is facilitated through the system by the "Bid-Ask Exchange" tables 210, 310 on the buyer's page (FIG. 7) and the seller's pricing page (FIG. 9), which the seller may access by a link on the seller's usage page, FIG. 8). Either buyer or seller may commence negotiations, which involve a process of resolving bid prices entered by the buyer and ask prices entered by the seller in their respective tables. Once negotiations begin, negotiations will continue until either a deal is reached, or one of the parties indicates to the system that it desires to cease negotiations.

The buyer enters bid prices through the buyer's "Bid-Ask Exchange" table 210 (see FIG. 7). The buyer has complete discretion over the bid prices.

Figure 9:
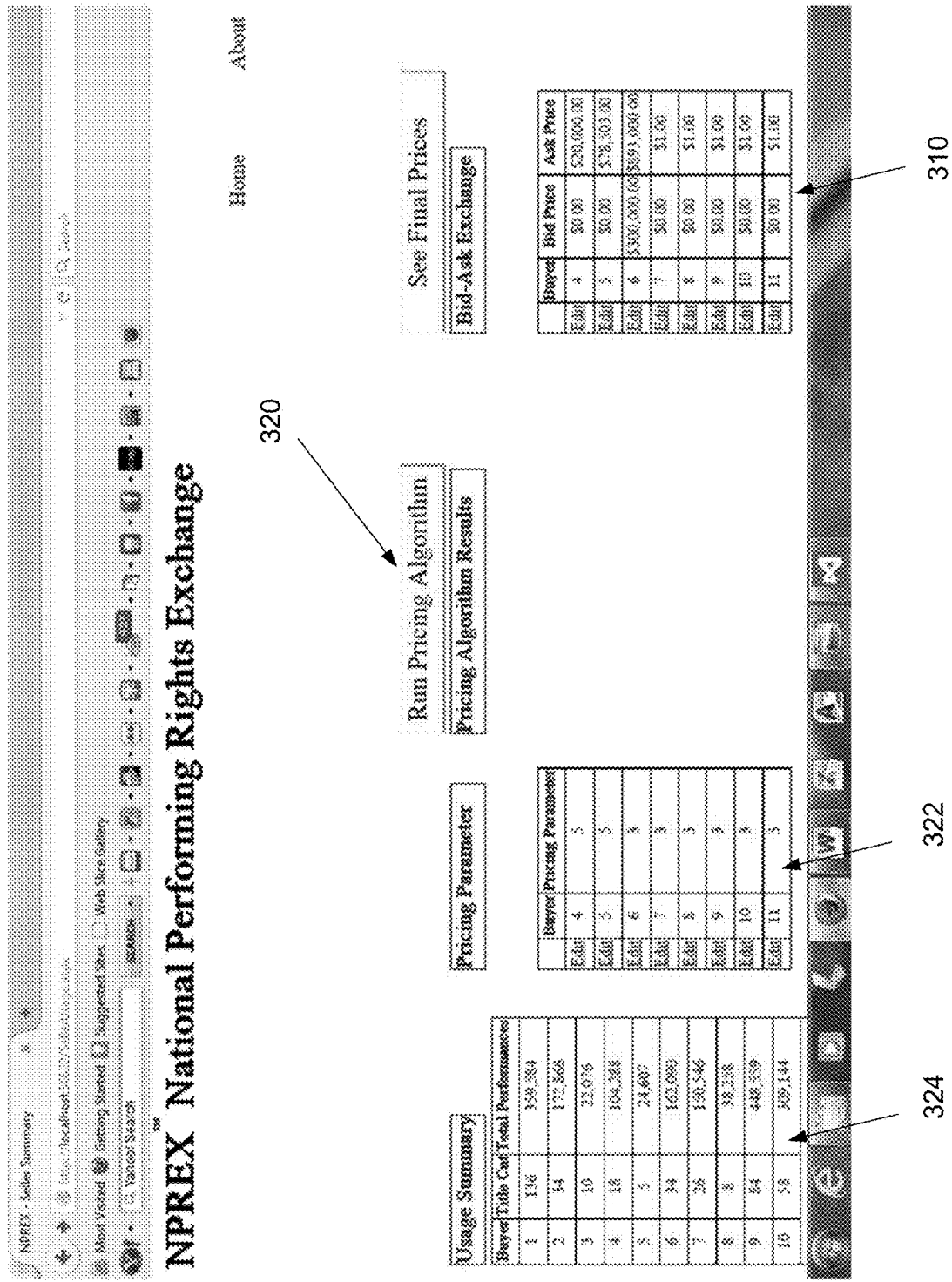
FIGS. 9-10 show examples of seller's pricing pages.
Figure 10:
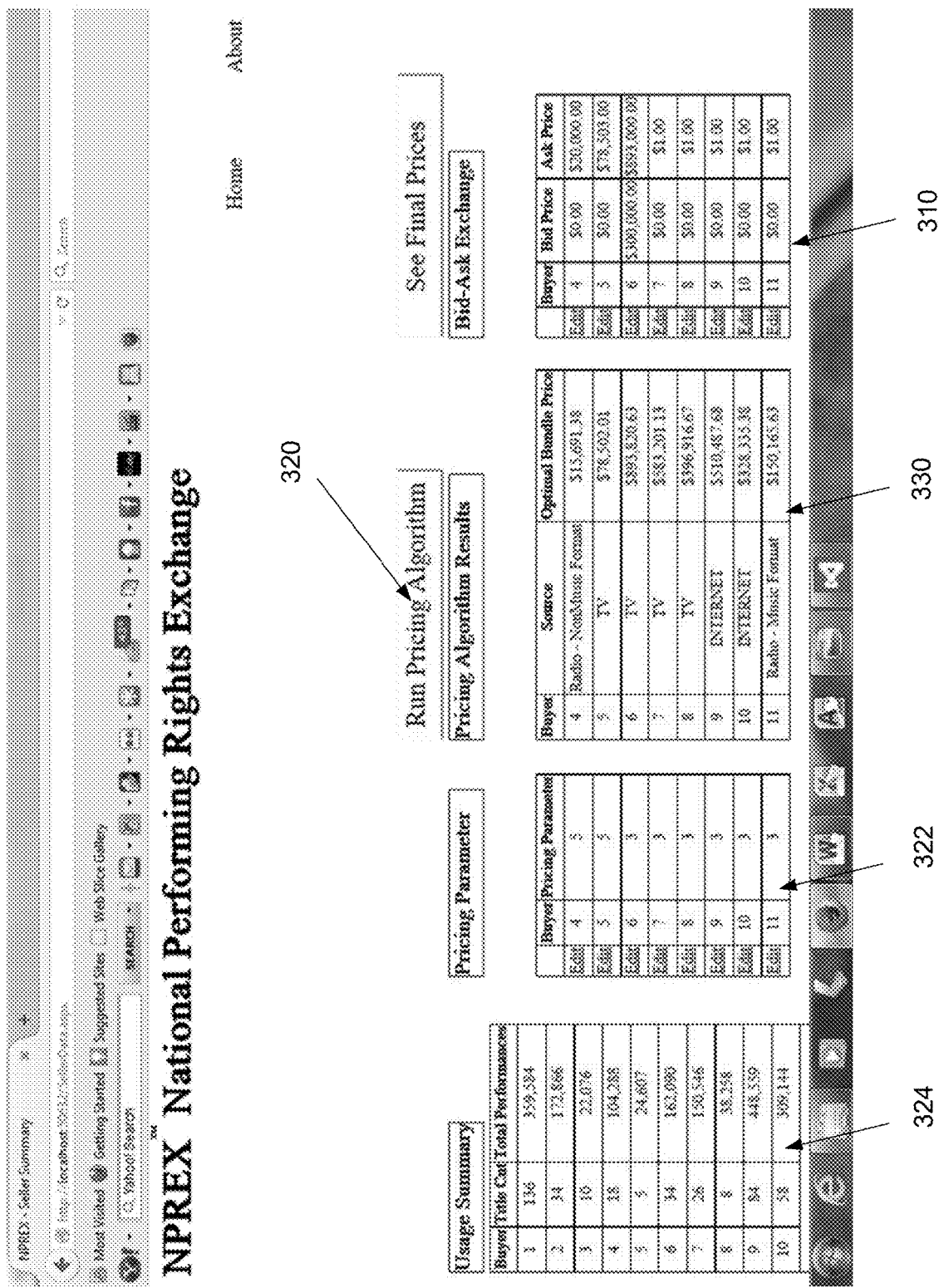

The seller enters ask prices through the seller's "Bid-Ask Exchange" table 310 (see FIGS. 9, 10). The seller has complete discretion over the ask prices. In one embodiment, the seller may use a pricing algorithm to generate suggested ask prices, but the seller may or may not take the generated ask prices into consideration in setting the ask price.

The pricing algorithm may be implemented by the seller from the seller's pricing page (i.e., by selecting the run pricing algorithm option 320). In one embodiment, the pricing algorithm generates a suggested ask price, shown in a pricing algorithm results table 330, based on the music usage record 324 for the title (which can include usage by multiple buyers), and a "Pricing Parameter" 322 that reflects the level of aggressiveness desired by the seller. The seller can enter pricing parameters for each buyer. In general, the lower the number for the Pricing Parameter, the more aggressively the seller desires to price. The seller generally has the discretion to determine how aggressively it desires to price. In the embodiment shown, the Pricing Parameter is a positive integer greater than or equal to "2". In this embodiment, "1" is equivalent to monopoly pricing, and is not permitted by the system. As seen in FIG. 10, the seller can then use pricing algorithm results to help determine his or her ask prices, at his or her discretion.

In several embodiments, the pricing algorithm is calibrated with the music buyer's (e.g., music broadcaster's) actual music usage data. It generates an optimized "nonlinear" price, or optimized blanket price, similar to the blanket license used in the music industry. The system can be used to negotiate a clearance in a variety of legal forms, including, but not limited to, licenses, covenants not-to-sue, and waivers. For example, the negotiation may be for an ex post clearance for previously unlicensed performances of the seller's copyrighted works, in which case the buyer is obtaining a promise (i.e., waiver, or covenant not-to-sue) from the seller not to sue the buyer for those previously unlicensed performances. In an alternative embodiment, the negotiation may be based, in whole or in part, on past performances that were licensed.

The pricing algorithm is an implementation of the solution to a particular mechanism design problem. The problem is tailored specifically to mimic the pricing problem of the empowered seller who is trying to sell a waiver of its right to sue for copyright infringement to a buyer with imperfectly observable characteristics who must purchase waivers from any number of other empowered sellers, all of whom want to make as much money as possible. The question becomes what is the price that makes an empowered seller as well off as possible, given that (i) the buyer has only so much money to spend, and (ii) there are some number of other empowered sellers out there, each one of which chooses its price so as to make itself as well off as possible, too. The pricing algorithm implements the solution to this problem in a novel manner.

A music user derives utility from using songs, or titles, and must buy clearance from each owner t for having used a certain number of the owner's songs. Let $t_i$ be the number of unique songs, or titles, owned by seller i for which the buyer may buy music clearance, where $t_i \in [t'_i, T_i]$. The lower bound $t'_i$ is strictly greater than zero but no larger than $T_i - \sqrt{T_i^2 - 2}$. This ensures that the direct utility function of the buyer and the per-customer profit function of the seller are well-defined.

The buyer derives direct utility from using songs, or titles, $t_i$ owned by seller i. Direct utility of the buyer with respect to the titles of seller i is given by $m_i(t_i; \alpha_i, \beta_i)$ for i=1, 2, . . . , N. Note that m(•) is a function of $t_i$ and that $(\alpha_i, \beta_i)$ are parameters. The function $m(t_i; \alpha_i, \beta_i)$ is continuous, differentiable and concave. The parameter $\alpha_i$ is the share of total performances by the particular buyer accounted for by the titles of seller i. For instance, if the buyer makes a total of 100 performances across all titles from all music owners, 10 of which are of titles owned by seller i, then $\alpha_i = 10/100 = 0.1$. The parameter $\beta_i$ equals the total count of unique titles owned by seller i that are used by the particular buyer over the specific time period. For instance, if a buyer used 100 unique titles owned by seller i during the course of a year, then $\beta_i = 100$. In several implementations of the pricing algorithm as described herein, $\beta_i := \beta_i + \sqrt{2}$. This will ensure that where $\beta_i = 1$ the results are well-defined and are consistent across a range of $\beta_i$. The specification of $m(t_i; \alpha_i, \beta_i)$ is chosen so as to ensure its maximum occurs at $t_i = \beta_i$.

Let $r(t_i; \alpha_i, \beta_i)$ be the natural logarithm of $m(t_i; \alpha_i, \beta_i)$. Because the natural logarithm is a monotonic transformation, the maximum of $r(t_i; \alpha_i, \beta_i)$ is the same as that of $m(t_i; \alpha_i, \beta_i)$. At $t_i = t'_i$, $r(t_i = t'_i; \alpha_1, \beta_i) = 0$.

In general, a buyer wants two things: to use songs, and to have money left over after having paid for music clearance. Residual revenue of the buyer is the revenue that remains after the buyer pays for music clearance. Define R as the periodic revenue of the buyer. The buyer uses this revenue to pay its costs, including music clearance. Where the number of sellers is N, the sum of all payments made for music clearance is the sum of prices paid to each seller, or $\Sigma_{i=1}^{N} P_i(t_i)$. Therefore, residual revenue is $W(P_1, P_2, \ldots, P_N; R) = R - \Sigma_{i=1}^{N} P_i(t_i)$.

The utility of the buyer, in general, thus depends on two things: (i) songs $t_i$, and (ii) residual revenue $W(P_1, P_2, \ldots P_N; R)$.

$$U' = \exp\left\{\frac{1}{1-\sigma} W(P_1, P_2, \ldots P_N; R)^{1-\sigma}\right\} \prod_{i=1}^{N} m_i(t_i; \alpha_i, \beta_i)$$

where $\sigma \neq 1$.

The natural log of U' is the following $$U = \ln U' = \frac{1}{1-\sigma} W(P_1, P_2, \ldots P_N; R)^{1-\sigma} + \sum_{i=1}^{N} r_i(t_i; \alpha_i, \beta_i) \quad (1)$$

where $$\sigma \equiv \frac{d\ln\left(\frac{t_i}{W}\right)}{d\ln p_i(t_i)},$$

where $$p_i = \frac{dP_i(t_i)}{dt_i},$$

the marginal price posted by the ith seller. Equation (1) thus shows the utility function of the buyer, where $W(P_1, P_2, \ldots, P_N; R) = [R - \Sigma_{i=1}^{N} P_i]$, and $\sigma \sim \text{uniform}(0,1)$.

The parameter $\sigma$ is the intertitle elasticity of substitution between songs and residual revenue. It measures the tendency of the buyer to change its mix of songs and residual revenue as the marginal price of a song changes. In the present invention, σ is a random variable, and its realizations are governed by the uniform distribution function bound between zero and one. To derive σ, take the first partial derivative of U with respect to $t_i$.

$$\frac{\partial U}{\partial t_i} = r_t - U_W p_i,$$

where $$r_t \equiv \frac{dr}{dt_i},$$

after dropping the subscript i on the left-hand side, $$U_W = \frac{1}{\left[R - \sum_{i=0}^{n} p_i\right]^\sigma}$$

$$p_i = \frac{dP_i}{dt_i}.$$

Setting $$\frac{\partial U}{\partial t_i} = 0$$

and taking natural logs gives $$\ln r_t = \ln U_W + \ln p_t$$

Then, computing the total differential yields $$\frac{r_{tt}}{r_t}dt = \frac{U_{WW}}{U_W}dW + d\ln p_i$$

In general, $$\frac{d\ln X}{dX} = \frac{1}{X},$$

and this implies X d ln X=dX. It follows that $$t\frac{r_{tt}}{r_t}d\ln t - W\frac{U_{WW}}{U_W}d\ln W = d\ln p(t).$$

Assuming that $$\frac{1}{\sigma} = t\frac{r_{tt}}{r_t} = W\frac{U_{WW}}{U_W},$$

it follows that $$\frac{1}{\sigma}[d\ln t - d\ln W] = d\ln p(t).$$

By the distributive property of the differential, we have $$\frac{1}{\sigma}d\ln\left(\frac{t}{W}\right) = d\ln p.$$

Rearranging gives $$\sigma = \frac{d\ln\left(\frac{t}{W}\right)}{d\ln p}$$

The utility of the buyer changes as it continues to use titles of seller i. The rate of change (i.e., the marginal utility with respect to title of seller i) is equal to the first partial derivative U with respect to $t_i$:

$$\frac{\partial U}{\partial t_i} = r_t - U_W p_i.$$

Because $U_W$ contains a realization of the random variable σ, the partial derivative is a random variable. Therefore, the best one can do is to enumerate the probability that the buyer continues to use (and requires forgiveness for) at least $t_i$ titles. Let the following denote this probability:

$$Prob\left(\frac{\partial U}{\partial s_i} > 0\right) = Prob(r_t - U_W p_i > 0) = Prob(r_t > U_W p_i).$$

Rearranging terms gives $$Prob\left(\left[R - \sum_{j=1}^{N} P_j\right]^\sigma > \frac{p_i}{r_t}\right) = Prob\left(\sigma > \frac{\ln\left[\frac{p_i}{r_t}\right]}{\ln\left[R - \sum_{j=1}^{N} P_j\right]}\right)$$

Based on the simplifying assumption that a is distributed uniformly on the unit interval, this probability is the following $$Prob\left(\sigma > \frac{\ln\left[\frac{p_i}{r_t}\right]}{\ln\left[R - \sum_{j=1}^{N} P_j\right]}\right) = 1 - \frac{\ln\left(\frac{p_i}{r_t}\right)}{\ln\left(R - \sum_{j=1}^{N} P_j\right)}. \quad (2)$$

This is a parametric expression of the market share of seller i. Of course, the relevant market is the market consisting of a set of buyers whose revenue equals R and music usage is summarized by the parameters $\{\alpha\}_{i=1}^{N}$ and $\{\beta\}_{i=1}^{N}$. Let this probability be denoted by $$D\left(t_i, P_i, \frac{dP_i}{dt_i}; P_{-i}, \alpha_i, \beta_i, R\right),$$

where $P_{-i}$ is every total price except seller i's.

$$D\left(t_i, P_i, \frac{dP_i}{dt_i}; P_{-i}, \alpha_i, \beta_i, R\right) = 1 - \frac{\ln\left(\frac{p_i}{r_t}\right)}{\ln\left(R - \sum_{j=1}^{N} P_j\right)}. \quad (3)$$

For shorthand, this can be written as $$D\left(t_i, P_i, \frac{dP_i}{dt_i}\right).$$

The seller i will offer forgiveness for a count of titles T, at a price $P_i(T_i)$ so as to maximize profit under the circumstances. The circumstances include the buyer's ability to pay, R, as well as the prices of the other sellers, which we denote $P_{-i}$ for all sellers other than i. The objective function of the seller is $$\max \int_{t_i'}^{T_i} [D(t_i, P_i, p_i; P_{-i}, \alpha_i, \beta_i) - Q][p_i - c_i]dt_i \text{ for } i = 1, \ldots, N, \quad (4)$$

where the marginal cost of the incremental title is zero, $c_i=0$ $\forall$ t. Initial conditions are $t_i=t'_i$ and $P_i(t_i=t'_i)=V$. But terminal conditions $T_i$ and $P_i(T_i)$ are free to be chosen optimally.

The problem of the individual seller is a free horizon problem in the calculus of variations. A general expression of a free horizon problem is the following. Let F be twice continuously differentiable. The problem is $$\max \int_{t_0}^{t_s} F(t, P(t), P'(t))dt \text{ s.t. } P(t_0) = P_0$$

where the initial points ($t_0$, $P(t_0)$) are given but neither of the terminal coordinates is necessarily fixed in advance.

The necessary and sufficient conditions for an extremal are as follows:

$$F_p - \frac{d}{dt}F_{p'} = 0 \forall t \quad 1.$$

$$[F - f_{p'}P']\Delta t_1 = 0 \text{ for } t = t_1 \quad 2.$$

$$F_{p'}\Delta P(t_1) = 0 \text{ for } t = t_1 \quad 3.$$

Use condition 2 to solve for $t_1$. Use condition 3 to solve for $P(t_1)$.

The problem in Equation (4) is the optimization program for the seller on NPREX or NSREX. Seller i maximizes its profit, given
1. the price quotes by all other sellers $P_j$ for $j \neq t$,
2. the revenue of the buyer, and
3. the music usage of the buyer as it relates to seller i, measured by $\alpha_i$ and $\beta_i$.

Profit per-buyer of seller i is defined by $$\int_{t_i'}^{T_i} [D(t_i, P_i, p_i; P_{-i}) - Q][p_i - c_i]dt_i \text{ for seller } i = 1, \ldots, N.$$

where $D(t_i, P_i, p_i; P_{-i})$ is the probability that the buyer purchases forgiveness or permission for at least $t_i$ titles owned by seller i at a total price of $P_i(t_i)$ and a marginal price of $$\frac{dP_i}{dt_i},$$

or $p_i$, given the total prices of all other sellers $P_{-i}$.

Q is the share of the market not served by seller i. In equilibrium, $$Q = \frac{(K-1)}{K}D(t_i, P_i, p_i; P_{-i}).$$

The interpretation of K is the following. K is the number of sellers of titles $t_i$. If seller i were a monopolist (and behaved like one), then K would equal 1. Sellers in all but one sector of music licensing post prices that are far from monopoly prices. The one sector that seems the exception is the digital sound recording sector where music labels and artists enjoy prices that are close to monopoly prices. Otherwise, in the performing rights industry, K assumes a value between 6 and 7, depending on the source: radio, digital streaming, TV, and the like.

$c_i(t_i)=0 \forall$ t for i=1, . . . , N.

$\alpha_i$ denotes the share of the total performances by the buyer accounted for by the titles owned by seller t.

$\beta_i$ denotes the number of titles owned by seller I that the buyer needs to clear.

Necessary and sufficient conditions for finding an optimum for seller i are the following:

$$[D_{p_i}(t_i,P_i,p_i;P_{-i})][p_i-c_i]-d/dt[D(t_i,P_i,p_i;P_{-i})-Q+D_{p_i}(t_i,P_i,p_i;P_{-i})p_i]=0 \; \forall t_i \quad 1.$$

$$[[D(t_i,P_i,p_i;P_{-i})-Q][p_i-c_i]-\{[D(t_i,P_i,p_i;P_{-i})-Q]+p_iD_{p_i}\}p_i]\Delta t=0 \text{ for } t_i=T_i \quad 2.$$

$$[D(t_i,P_i,p_i;P_{-i})-Q+D_{p_i}(t_i,P_i,p_i;P_{-i})p_i]\Delta P=0 \text{ for } t_i=T_i \quad 3.$$

Condition 2 determines $T_i$. Condition 3 determines $P_i(T_i)$, the price charged by seller i for access to $T_i$ titles. After having solved for $T_i$ and $P_i(T_i)$ for all i=1, . . . , N, for present purposes, the problem is solved. The solution of Condition 1 is an academic exercise. The solution to Condition 3 must be consistent with the solution of Condition 2, and vice-versa. Showing that Condition 2 is consistent with Condition 3 requires Condition 1.

Condition 2 requires $$[[D(t_i,P_i,p_i;P_{-i})-Q][p_i-c_i]-\{[D(t_i,P_i,p_i;P_{-i})-Q]+p_iD_{p_i}\}p_i]\Delta t=0 \text{ for } t_i=T_i$$

First, let $$Q = \frac{(K-1)}{K}D(t_i, P_i, p_i; P_{-i})$$

and recall that $c_i=0$. This leaves us with $$p_i\frac{1}{K}D - p_i\left[\frac{1}{K}D + p_iD_{p_i}\right] = 0$$

$$-p_i^2 D_{p_i}=0 \text{ at } t_i=T_i,$$

$$p_i(t_i=T_i)=0.$$

This says that, at $t_i=T_i$, the marginal price of the last title, $p_i(t_i=T_i)$, equals 0. Evaluate the marginal utility with respect to titles of seller i at $p_i(T_i)=0$ and then set the result to zero so as to solve for $T_i$. The marginal utility with respect to titles of seller i is $$\frac{\partial U}{\partial t_i} = r_t - U_W p_i$$

Evaluate this equation at $t_i=T_i$. Condition 2 requires $p_i(t_i=T_i)=0$, which gives $$\left.\frac{\partial U}{\partial t_i}\right|_{t_i=T_i} = (r_t - U_W p_i)|_{t_i=T_i} = (r_t - 0)|_{t_i=T_i} = r_t|_{t_i=T_i}.$$

By the specification of $r(t_i; \alpha_i, \beta_i)$ and of its derivative with respect to $t_i$, it follows that the optimal $T_i$ equals $\beta_i$. Incidentally, this finding serves to reconcile the assumption made at the outset that $\beta_i$ captures the unique titles owned by seller i for which the buyer must buy clearance.

Condition 3 requires $D(t_i, P_i, p_i; P_{-i})-Q+D_{p_i}(t_i, P_i, p_i; P_{-i})p_i=0$ at $t_i=T_i$.

Impose the assumption that in equilibrium $$Q = \frac{(K-1)}{K} D(t_i, P_i, p_i; P_{-i}).$$

This gives $$\left(\frac{1}{K}D + p_i D_{pi}\right)\bigg|_{t_i=T_i} = 0.$$

Recalling equation (3), we have $$D(\cdot) = 1 - \frac{\ln\left(\frac{p_i}{r_t}\right)}{\ln\left(R - \sum_{j=1}^{N} P_j\right)}.$$

After some algebra, Condition 3 becomes $$\ln\left(\frac{W}{p_i/r_t}\right) = K$$

Taking the exponential of each side yields $$\frac{W}{p_i/r_t} = e^K.$$

Solving for p, and recalling that $W(P_1, P_2, \ldots P_N; R)=[R-\Sigma_{i=1}^N P_i]$ yields the following:

$$p_i = r_t(t_i; \alpha, \beta) e^{-K} \left(R - \sum_{j=1}^{N} P_j\right) \text{ for } i = 1, \ldots, N.$$

This is a first-order non-homogeneous differential equation with non-constant coefficients. Some rearranging will help make this clear. First, recall that $$p_i = \frac{dP_i}{dt_i}.$$

Next, gather like-terms on the left-hand side of the equation.

$$\frac{dP_i}{dt_i} + e^{-K r_t(t_i;\alpha,\beta)} P_i = e^{-K r_t(t_i;\alpha,\beta)} \left(R - \sum_{j\ne i}^{N} P_j\right)$$

with initial condition $P_i(t_i=t'_i)=V$. The initial condition is the price of the bundle that yields zero utility as measured by Equation (1). V may be positive in the presence of seller-specific fixed costs of clearing music; otherwise, V=0. The general solution is the following $$P_i = e^{-\int r_t e^{-K} d\tau}\left[C + \int r_s e^{-K}\left(R - \sum_{j\ne i}^{N} P_j\right) e^{\int r_t e^{-K} d\tau} ds\right],$$

where C is the constant of integration. Straight-forward integration yields the simplified general solution $$P_i = Ce^{-(r(t_i;\alpha_i,\beta_i)e^{-K})} + \left(R - \sum_{j\ne i}^{N} P_j\right) \quad (5)$$

Recalling that $r(t_i=t'_i; \alpha_i,\beta_i)=0$, use the initial condition $P_i(t_i=t'_i)=V$ to solve for C:
$$Ce^{-(0e^{-K})} + (R-\Sigma_{j\ne i}^N P_j) = V \Rightarrow C = V - (R-\Sigma_{j\ne i}^N P_j).$$

Substituting the solution for C back into the general solution in (5) yields the particular solution, $$P_i(T_i) = \left[V - \left(R - \sum_{j\ne 1}^{N} P_j\right)\right] e^{-e^{-K} r(T_{ij}\alpha_{ij}\beta_i)} + \left(R - \sum_{j\ne 1}^{N} P_j\right) =$$

$$(1-d_i)\left(R - \sum_{j\ne 1}^{N} P_j\right) + d_i V$$

where $d_i = e^{-(e^{-K} r(T_i;\alpha_i,\beta_i))}$.

If the initial price V equals zero (V=0), the particular solution involving a percentage of the seller's residual revenue, where $d_i \in (0,1)$, emerges as follows:

$$P_i(T_i) = (1-d_i)\left(R - \sum_{j\ne i}^{N} P_j\right), \text{ for } i=1,\ldots,N \quad (5')$$

To show consistency with Condition 2, we can show that $(1-d_i)(R-\Sigma_{j\ne 1}^N P_j)$, where $d_i = e^{-(r(t_i;\alpha_i,\beta_i)e^{-K})}$, is maximized such that $$\frac{dP_i}{dt_i} = p_i = 0.$$

So, choose the value of $t_i$ such that $(1-d_i)(R-\Sigma_{j\ne 1}^N P_j)$ is maximized. The maximum occurs at $t^*_i=\beta_i$. Recall from Condition 2 that $T_i=\beta_i$. Thus, the two results are consistent.

The above section derives the solution to the ordinary differential equation that, when evaluated at $t_i=T_i$, results in the optimal price that seller i will offer, given the prices of all other sellers. The present invention then characterizes the equilibrium set of prices for all N sellers as follows. First, make the simplifying assumption that V=0. Next, build a system of equations as follows $$P_i(T_i) = (1-d_i)\left(R - \sum_{j\ne i}^{N} P_j\right) \text{ for } i=1,\ldots,N.$$

Solve each equation for the percentage of revenue (R), as follows $$P_i(T_i) = (1 - d_i)\sum_{j \ne i}^{N} P_j = (1 - d_i)R \text{ for } i = 1, 2, \ldots, N.$$

The resulting system of equations is the following $$\begin{bmatrix} 1 & 1-d_1 & 1-d_1 & \ldots & 1-d_1 \\ 1-d_2 & 1 & 1-d_2 & \ldots & 1-d_2 \\ 1-d_3 & 1-d_3 & 1 & \ldots & 1-d_3 \\ \vdots & & & \ddots & \vdots \\ 1-d_N & 1-d_N & 1-d_N & \ldots & 1 \end{bmatrix} \begin{bmatrix} P_1 \\ P_2 \\ P_3 \\ \vdots \\ P_N \end{bmatrix} = \begin{bmatrix} (1-d_1)R \\ (1-d_2)R \\ (1-d_3)R \\ \vdots \\ (1-d_N)R \end{bmatrix}$$

Write the system in matrix notation. Denote the N×N matrix by $\Gamma_1$. Denote the N×1 price vector by P and the N×1 percentage of revenue vector by R. The system is $\Gamma_1 P = R$.

To solve this, pre-multiply both sides by $(\Gamma_1'\Gamma_1)^{-1} \Gamma_1'$. This gives $(\Gamma_1'\Gamma_1)^{-1}(\Gamma_1'\Gamma_1)P = (\Gamma_1'\Gamma_1)^{-1}\Gamma_1'R$. The left-hand sides becomes P. The equilibrium price vector, P, equals the solution $$P = (\Gamma_1'\Gamma_1)^{-1}\Gamma_1'R, \quad (6)$$

The pricing algorithm will tell each seller i=1, . . . , N its element of P. For every buyer that must clear music with seller i, this exercise is repeated so that the system of the present invention can advise seller i of its set of optimal prices. The present invention thus incorporates data and information in a real-time manner that the participants could not do outside a computer-implemented system as described herein. Although seller i will not necessarily know that the particular buyer must transact with N−1 other sellers, the present invention will know this as it solves for the prices in Equation (6). Furthermore, if seller I transacts with 10 other buyers, then this system will be estimated for each of those 10 buyers, and the present invention explicitly incorporates the interdependencies between the sellers into the suggested prices.

Calibrating $K_i$ for i=1, . . . , N is performed as follows. Given $\alpha_i$, $\beta_i$, $T_i$ and R, as well as a price vector ($P_1$, $P_2$, . . . , $P_N$), a single seller i can solve for $$K_i = -\ln\left\{-\frac{1}{r(T_i; \alpha_i, \beta_i)} \ln\left[1 - \frac{P_i}{R - \sum_{j=1}^{N} P_j}\right]\right\} \text{ for } i = 1, \ldots, N. \quad (7)$$

The question then is what values should the seller give to ($P_1$, $P_2$, . . . , $P_N$). PRO pricing gives a benchmark. For terrestrial radio, take 3.6 percent of the annual revenue, R, of a radio station. Then, multiply 0.036R by $\alpha_i$ to arrive at an estimate of $P_i$ for i=1, . . . , N. Then, evaluate $r(T_i; \alpha_i, \beta_i)$. Finally, equation (7) provides the value of K that is consistent with PRO-pricing. Although sellers do not have the data necessary to generate values through Equation (7), the system of the present invention does. The system provides these values to the sellers so that the sellers have a starting point for pricing clearance.

Some music users must acquire a host of different rights to perform a song. For instance, a digital streaming service that performs a song protected by copyright must pay the music publisher for the performance right and the music label for the digital sound recording. For instance, to clear Frank Sinatra's recording of "My Way" written by the singer-songwriter Paul Anka, the digital streaming service must buy clearance from the music publisher that owns the public performance right and the music label that owns the sound recording. The proverbial right and left shoe, one is useless without the other to the digital streaming service. In the synchronization licensing space, where a TV producer who may want to use in a TV show Bruce Springsteen's original recording of "Jungleland," the TV producer must secure the performance right from Springsteen's music publisher and the master recording from Springsteen's music label. Again, one is useless without the other. The TV producer must have both types of music clearance in order to avoid copyright infringement. Some digital streaming services also allow downloads. Downloads require the so-called mechanical right in addition to the performing right and digital sound recording right. For these services, at least three rights (i.e., mechanical, public performing and the digital sound recording) are implicated.

Therefore, a well-designed price mechanism must incorporate the complementarity of the underlying rights. In several embodiments, the present invention implements such a price mechanism, as described below. Start with the mechanism in Equation (7) and incorporate one additional right. The incorporation of additional complements is straight-forward.

Assume for every set of titles i=1, . . . , N in the system there are two sellers. The (N×N) dimension of $\Gamma_1$ becomes (2N×2N). The dimension of the price vector P is (2N×1). Likewise, the dimension of the percent of revenue vector R is (2N×1). In general, if there are n rights for every set of titles, then the system becomes the following:

$$\Gamma P = R$$

$$(nN \times nN)(nN \times 1)(nN \times 1)$$

Assume n=2. Construct the system as follows.

$$\begin{bmatrix} 2-d_{1,1} & 1-d_{1,1} & 1-d_{1,1} & 1-d_{1,1} & \ldots & 1-d_{1,1} \\ 1-d_{1,2} & 2-d_{1,2} & 1-d_{1,2} & 1-d_{1,2} & \ldots & 1-d_{1,2} \\ 1-d_{2,1} & 1-d_{2,1} & 2-d_{2,1} & 1-d_{2,1} & \ldots & 1-d_{2,1} \\ 1-d_{2,2} & 1-d_{2,2} & 1-d_{2,2} & 2-d_{2,2} & \ldots & 1-d_{2,2} \\ \vdots & & & \ddots & & \vdots \\ 1-d_{N,2} & 1-d_{N,2} & 1-d_{N,2} & 1-d_{N,2} & \ldots & 2-d_{N,2} \end{bmatrix} \begin{bmatrix} P_{1,1} \\ P_{1,2} \\ P_{2,1} \\ P_{2,2} \\ \vdots \\ P_{N,2} \end{bmatrix} = \quad (8)$$

$$\begin{bmatrix} (1-d_{1,1})R \\ (1-d_{1,2})R \\ (1-d_{2,1})R \\ (1-d_{2,2})R \\ \vdots \\ (1-d_{N,2})R \end{bmatrix}$$

where $d_{i,j} = e^{-r(T_i; \alpha_i, \beta_i)e^{-K_{ij}}}$ for i=1 . . . , N sets of titles and i=1, . . . , n. Here, n=2.

The significance of $K_{ij}$ for j=1, 2 is the following. $K_{ij}$ imparts on the system the market power exercised by seller i of the jth right associated with the ith set of titles. Note that, for the ith set of titles, $K_{i1}$ does not necessarily equal $K_{i2}$. Suppose the two rights at issue are (i) the performing right, and (ii) the digital sound recording. Prices in the performing rights sector are significantly lower than those in the digital sound recording sector. This is due in large part to federal regulation that imparts competitive pressure on the prices charged by ASCAP and BMI. Let $K_{i1}$ correspond to the implicit count of sellers of the performing right and $K_{i2}$ to that of the digital sound recording right. Because the effective market power imparted by the digital sound recording industry far exceeds that of the performing rights sector, one should expect that $K_{i1} > K_{i2}$.

The system calibrates $K_{i,j}$ for j=1, 2 as follows. Given $\alpha_i, \beta_i, T_i$ and R, as well as a price vector $(P_{11}, P_{12}, P_{21}, P_{22}, \ldots, P_{N1}, P_{N2})$, a single seller t, j can solve for $$K_{ij} = -\ln\left\{-\frac{1}{r(T_i; \alpha_i, \beta_i)}\ln\left[1 - \frac{P_{i,j}}{R - \sum_{j=1}^{z}\sum_{k=1}^{N}P_{k,j}}\right]\right\} \text{ for } i = 1, \ldots, \quad (9)$$

N and j = 1, 2.

The implementation of the algorithm accounts for all combinations of buyers and sellers that are present in the music usage record. The algorithm allows for the possibility that agreements between a buyer and a seller will be finalized over time. As actual agreements are made, the algorithm will acknowledge this and reduce the ability to pay of the buyer by the amount of each deal. However, the relative importance of a group of sellers is invariant to time and the existence of finalized deals. This rules out, at least in the pricing algorithm, the accretion of importance to would-be hold-out sellers.

The exchange of the present system allows each buyer to see the various sellers with whom it must enter into deals. Likewise, the exchange allows each seller to see which buyers have used its music and therefore must acquire a waiver to avoid infringement liability. The algorithm described above helps the seller price its waivers, but does so with knowledge of the number of interconnections between buyers and sellers. A given seller can tell, for instance, that it needs to engage buyers 1, 2 and 3 in separate transactions. But this seller cannot see how many other sellers each of these buyers needs to engage. It might be that buyer 1 must engage 15 sellers, whereas buyers 2 and 3 each must engage 30 sellers. A seller will see only those buyers that used its music. A seller will not see, for a given buyer, the other sellers with whom it competes for the buyer business. But, the system can see this, and the system exploits these precise interdependencies in deriving the optimal prices for each seller. The system can see the many interconnections between buyers and sellers. Ultimately, the system is the means by which the positive externalities of the marketplace are transmitted to the sellers. In this way, the system is the key to unlocking the benefits of a marketplace for performing rights.

As an example of the process, consider a fictional radio station WLEE-FM that seeks to purchase clearance for the music it performed during the calendar year 2013. The system informs WLEE-FM that it needs clearance from six different empowered sellers. The music usage record which is presented to the radio station appears in Table 1. WLEE-FM used 34 titles owned by Seller 1 a total of 172,866 times in 2014. Similarly, WLEE-FM used 36 titles owned by Seller 2 a total of 173,496 times in 2014. Seller 9 owns 132 of the titles WLEE-FM used a total of 635,096 times in 2014. In all, WLEE-FM needs to engage Sellers 1, 2, 9, 10, 14 and 17 in transactions so as to clear these performances.

TABLE 1

Music Usage Record of WLEE-FM for 2014

| Seller | Title Count | Total Performances |
|---|---|---|
| 1 | 34 | 172,866 |
| 2 | 36 | 173,496 |
| 9 | 132 | 635,096 |
| 10 | 12 | 66,470 |
| 14 | 50 | 293,150 |
| 17 | 120 | 556,990 |

A third-party data provider informs the system that WLEE-FM made $85 million in revenue in 2014. The algorithm will incorporate this revenue amount into its calculations. It can be demonstrated that the percent-of-revenue fee structure is the optimal fee structure under the conditions that prevail in the performing rights industry. Thus, the algorithm computes the optimal percent of revenue to apply to a given revenue amount.

Either party-buyer or seller-may initiate a transaction. Here, the buyer, WLEE-FM, starts the bidding. Having paid to ASCAP and BMI last year a total of 3.5 percent of its $85 million in total revenue, the buyer offers to each seller its performance-based pro-rata share. Accordingly, WLEE-FM enters a Bid Price to Seller 1 of $270,947. Seller 2 is offered $271,934. Seller 9 receives an offer of $995,438. This example focuses on just these three transactions.

Upon receipt of the offer, Seller 1 asks the algorithm for a price, given a pricing parameter for WLEE-FM of 5. The algorithm suggests a price of $315,117. Seller 1 likes this and enters an Ask Price of $315,117. Seller 2, coincidentally, inputs 5 as the pricing parameter for WLEE-FM and asks the algorithm for a price. The algorithm returns a price of $321,964. Seller 2 does not think this will be accepted, so Seller 2 recalibrates the algorithm at a pricing parameter of 5.05. This time, the suggestion is $306,289. Seller 2 approves and enters this as its Ask price. Seller 9, again coincidentally, enters 5 for its Pricing Parameter with respect to WLEE-FM. The algorithm returns a suggested Ask Price of $1,665,639. Seller 9 approves and enters it as its Ask Price.

WLEE-FM returns to its account on the system to find that all six sellers have countered. Table 2 shows what WLEE-FM sees in the Bid-Ask Exchange table.

TABLE 2

Bid-Ask Exchange

| Seller | Ask Price | Bid Price |
|---|---|---|
| 1 | $315,117.57 | $270,947.27 |
| 2 | $306,289.00 | $271,934.00 |
| 9 | $1,665,331.52 | $995,438.00 |
| 10 | $81,364.97 | $80,000.00 |
| 14 | $600,252.36 | $500,000.00 |
| 17 | $1,427,764.29 | $900,000.00 |

WLEE-FM counters with $300,000, $301,000 and $1.2 million to Sellers 1, 2 and 9, respectively.

Seller 1 recognizes that a bid of $300,000 is a significant improvement over the initial bid. This is reasonable to Seller 1, and so Seller 1 accepts by entering an Ask Price of $300,000. The deal is closed.

Seller 2 finds the bid of $301,000 is too low. Seller 2 wants to counter but first checks the algorithm. Leaving the pricing parameter set at 5.05, Seller 2 runs the algorithm and sees that the estimate has fallen slightly from $306,289 to $305,208. Seller 2 finds $305,208 a reasonable asking price and submits this as his counter, which is accepted by WLEE-FM.

Seller 2 is curious why the estimate differs from its previous amount. The estimate fell from $306,289 to $305,208 because the algorithm accounted for the finalized price of the Seller 1 transaction, which differed from the algorithm's suggested price. In general, if all sellers priced as the algorithm suggested and if no seller changed its pricing parameter from its initial setting, the results of the algorithm would be invariant to changes in the status of a deal, whether finalized or not. If it were otherwise, the algorithm would enable what economists call the "hold-out" problem. The hold-out problem arises where a hold-out seller threatens to block the final acquisition of a necessary element of a multi-unit purchase. The hold-out seller asks for an abnormally high price, knowing that it is dealing with a buyer whose previous commitments to buy the other units of the multi-unit item amount to nothing more than sunk costs.

To avoid this, the system of the present invention takes two measures. First, it ensures that as deals are done the buyer's revenue is reduced by the amount of each finalized fee. Second, the system makes no revisions to the initial measure of importance of each seller. So, if a seller with 10 percent importance at the outset is a hold-out, this seller will remain a "10 percent seller" even if it is the only hold-out seller trying to command a monopoly position. In short, the relative importance of each seller is not updated as deals are done and negotiations linger.

The transaction with Seller 9 concludes similarly. Of course, a seller may choose to insist on a high price. But this may not be an orderly transaction, and the seller that chooses to behave this way probably will find well-meaning music broadcasters avoiding its catalog in the future.

Figure 11:
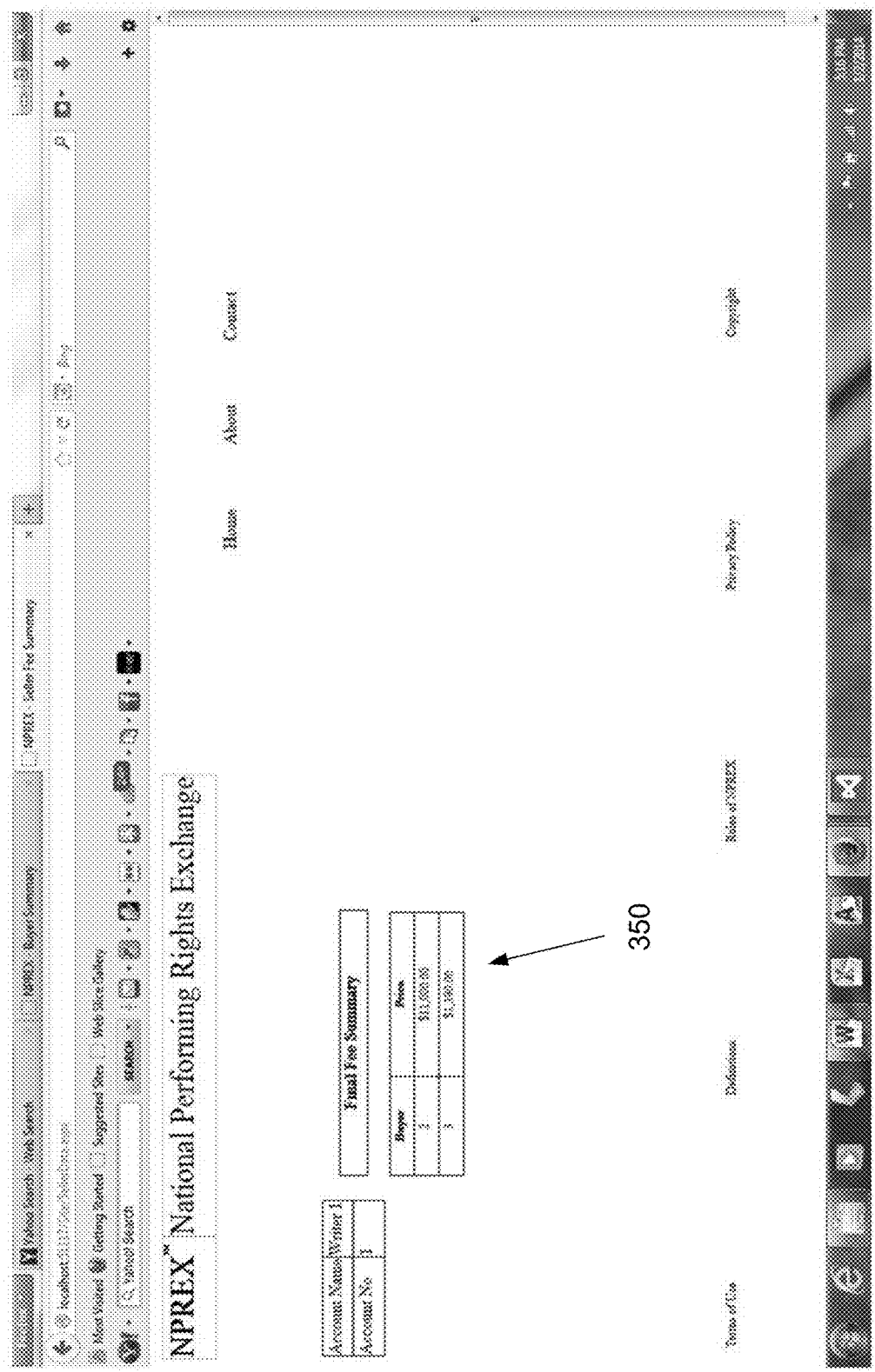
FIG. 11 shows an example of a final fee summary page.

If the negotiation process concludes with an agreement between the seller and buyer, the system generates a final fee summary 350, as seen in FIG. 11. Payment between the parties can be direct, or may be facilitated or effected through the system.

Figure 12:
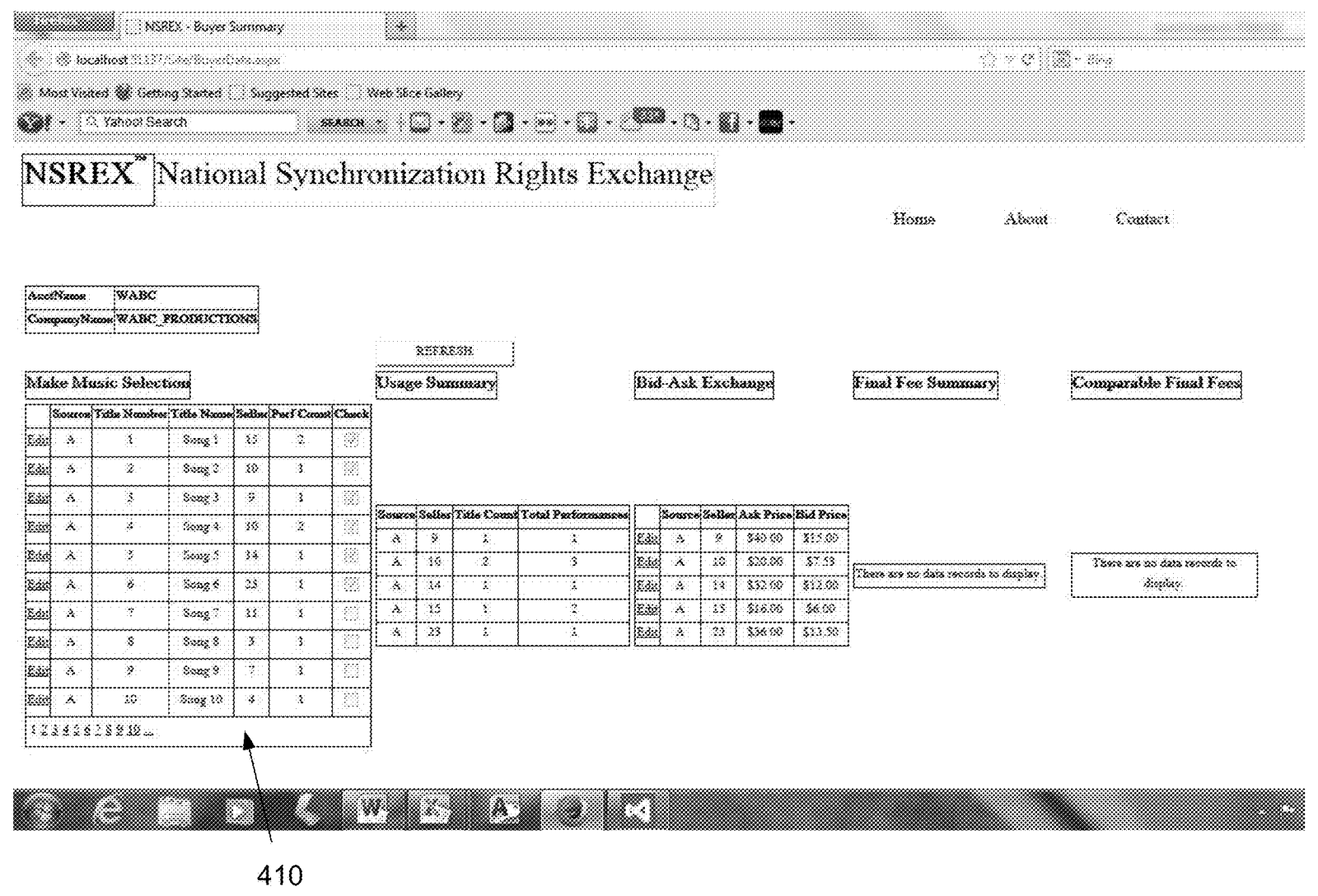

It should be noted that the above system can be used to purchase permission for future performances (i.e., synchronization rights) (NSREX) as opposed to purchasing forgiveness for past performances (NPREX). The NSREX system works like the NPREX system described above, except that the buyer chooses the works (e.g., song or songs) from a list of works within the system, as seen in the buyer's page in FIG. 12.

The buyer is presented with a make music selection table 410 which lists works by source, title number, title name and seller. The user enters performance counts and checks the box to indicate works of interest. Usage summary tables and the bid-ask exchange tables function similarly as described above. The tally of unique title counts and performance counts are sent to the sellers, who can then run the pricing algorithm for pricing guidance. The negotiation process proceeds as described above.

simple example of a transaction for permission is as follows. A potential buyer of permission to use the music of another comes into the exchange and finds the music selection table 410. This buyer selects five songs by checking the appropriate boxes in the table. The system then updates the buyer's usage summary table, which summarizes these selections by seller. The bid-ask exchange table is updated so that the buyer may attempt to purchase permission from each seller. The buyer will likely initiate a transaction by sending a bid price to a seller. The seller may accept or counter (possibly using the pricing algorithm as noted above). If the seller counters, the buyer may accept, counter or reject the offer by simply removing the check in the appropriate place within the make music selection table. Details of finalized deals with appear in the comparable final fees table, just as in 214 in FIG. 7. There is no distinction between NPREX and NSREX as far as the seller's interface is concerned.

A feature of the present invention should be noted as applied to the market for synchronization licenses. The synchronization licensing market tends to trade in two rights: synchronization rights and master recording rights. These are complementary rights. The pricing algorithm in NSREX (and in NPREX) will account for them. Equations (8) and (9) disclose how the pricing algorithm handles the nonlinear pricing of complementary rights.

Accordingly, the present invention provides a means for sellers to deal with the many relationships with buyers, who in turn who have many relationships with the sellers. The multitude of relationships make it very difficult, as a practical matter, for any one participant to price optimally. The pricing mechanism described above recognizes the many relationships, and solves for the optimal price in light of these many interconnections. The system can handle, but is not limited to, performing rights, sound recording rights, synchronization rights, and master recording rights.

In order to provide a context for the various aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), network PCs, minicomputers, mainframe computers, embedded systems, distributed computing environments, and the like.

Embodiments of the invention may be implemented in the form of computer-executable instructions, such as program code or program modules, being executed by a computer or computing device. Program code or modules may include programs, objections, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices.

In one embodiment, a computer system comprises multiple client devices in communication with at least one server device through or over a network. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

The following are sample representative claims, as might appear in a non-provisional application claiming benefit to the filing date of this provisional application.

Since the present application is a provisional application, no claim is required. Thus, by presenting the following representative claims, the intention is that the representative claims shall be considered as a part of the disclosure of the invention only, and shall not be a limitation, with respect to the range of equivalents or scope, of any claims which might ultimately issue in any applications claiming priority to this provisional application.

What is claimed is:

1. A system for facilitating the clearances of copyrighted music works, comprising:
    at least one computer server with a processor or microprocessor coupled to a memory, said at least one server accessible through a web browser on the Internet, wherein said processor or microprocessor is programmed to:
    store, in a database in electronic communication with said at least one computer server, historical data on the time, place and either frequency or duration of musical work usage information by a music user for a musical work in a plurality of musical works;
    store, in a database in electronic communication with said at least one computer server, data on the identity of each owner of said musical work and the percentage ownership of each said owner; and automatically match, using said processor or microprocessor, a seller of rights for musical works with a buyer of rights for musical works from a plurality of buyers of rights in musical workers in order for the buyer to purchase directly from the seller clearance for heretofore unlicensed performances of one or more musical works owned by the seller by:

providing, to the seller through a graphical user interface, historical data on the time, place and extent of any unlicensed usage for at least one of said one or more musical works by one or more users;

receiving, over a communications network, a price parameter from the seller, wherein said price parameter measures the bargaining power of the seller;

automatically calculating, using said processor or microprocessor, an equilibrium price, calibrated with the price parameter and pursuant to an equilibrium pricing algorithm describing the optimal price the seller should charge that particular buyer based on (1) the usage by the buyer of the musical work owned by the seller, (2) the buyer's ability to pay, (3) the chosen price parameter, (4) the existence of other sellers transacting with the buyer; (5) the number of other sellers with whom each buyer from said plurality of buyers must engage for works of said other sellers, wherein the seller does not know the existence of or the number of said other sellers with respect to the buyer; and (6) the equilibrium prices for all of said works of said other sellers;

automatically transmitting to the seller over a communications network and through a graphical user interface said automatically calculated equilibrium price;

receiving from the seller over a communications network a chosen ask price based on the equilibrium price;

automatically transmitting over said communications network to said particular buyer said chosen ask price;

receiving a bid price from the buyer over said communications network;

automatically finalizing the settlement of a transaction between the buyer and seller by closing a transaction when the bid price is within a pre-determined range of the chosen ask price; and automatically updating in real-time the equilibrium prices for all of said works of all of said other sellers after said transaction is closed, and automatically transmitting said updated equilibrium prices to said other sellers.

2. The system of claim 1, further wherein the buyer's ability to pay is based upon the buyer's remaining revenue available for clearance transactions.

3. The system of claim 1, further wherein the automatic calculation of the equilibrium price is not based on the relative importance of the seller compared to other sellers involved in clearance transactions with said buyer.

4. The system of claim 1, wherein said processor or microprocessor is programmed to present to said first user a list or table of all musical works for which there is historical usage data for said buyer.

5. The system of claim 1, wherein said processor or microprocessor is programmed to present to said buyer a list or table of all sellers of musical works for which there is historical usage data for said buyer.

6. The system of claim 1, wherein each seller is presented with a list or table of all buyers for which there is historical usage data by said buyers of a musical work of said seller.

7. The system of claim 1, wherein said seller does not possess information about how many other sellers said buyer needs to engage in clearance transactions.

8. The system of claim 1, wherein said buyer does not possess information about how many other users the seller needs to engage in clearance transactions.

9. A system for negotiating rights to copyrighted works, comprising:

at least one computer server with a processor or microprocessor coupled to a memory, said at least one computer server accessible through a web browser on the Internet, wherein said processor or microprocessor is programmed to:

store, in a database in electronic communication with said at least one commuter server, historical data on the time, place and either frequency or duration of musical work usage information for a copyrighted work in a plurality of copyrighted works;

store, in a database in electronic communication with said at least one computer server, data on the identity of each owner of said copyrighted work and the percentage ownership of each said owner; and automatically match, using said processor or microprocessor, a seller of rights for copyrighted works with a buyer from a plurality of buyers of rights for musical works in order for the buyer to purchase directly from the seller rights to one or more copyrighted works owned by the seller by:

providing, to the seller through a graphical user interface, historical data on the time, place and extent of any usage for at least one of said copyrighted works by one or more users;

receiving, over a communications network, a price parameter from the seller, wherein said price parameter measures the bargaining power of the seller;

automatically calculating, using said processor or microprocessor, an equilibrium price, calibrated with the price parameter and pursuant to an equilibrium pricing algorithm describing the optimal price the seller should charge that particular buyer based on (1) the usage by the buyer of the musical work owned by the seller, (2) the buyer's ability to pay, (3) the chosen price parameter, (4) the existence of other sellers transacting with the buyer; (5) the number of other sellers with whom each buyer from said plurality of buyers must engage for works of said other sellers, wherein the seller does not know the existence of or the number of said other sellers with respect to the buyer; and (6) the equilibrium prices for all of said works of said other sellers;

automatically transmitting to the seller over a communications network and through a graphical user interface said automatically calculated equilibrium price;

receiving from the seller over a communications network a chosen ask price based on the equilibrium price;

receiving a bid price from the buyer over said communications network;

automatically finalizing the settlement of a transaction between the buyer and seller by closing a transaction when the bid price is within a pre-determined range of the chosen ask price and automatically updating in real-time the equilibrium prices for all of said works of all of said other sellers after said transaction is closed, and automatically transmitting said updated equilibrium prices to said other sellers.

10. The system of claim 1, wherein the equilibrium pricing algorithm comprises the following:

$$F=(\Gamma'_1\Gamma_1)^{-1}\Gamma'_1 R,$$

where the equilibrium price vector is P, the percentage of revenue vector is R, and the gamma matrix is $\Gamma_1$.

* * * * *